(12) United States Patent
Kandasamy

(10) Patent No.: US 6,219,799 B1
(45) Date of Patent: *Apr. 17, 2001

(54) TECHNIQUE TO SUPPORT PSEUDO-NAMES

(75) Inventor: Subbiah Kandasamy, Cipertinio, CA (US)

(73) Assignee: Unisys Corporation, Blue Bell, PA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/905,097

(22) Filed: Aug. 1, 1997

Related U.S. Application Data

(60) Provisional application No. 60/051,425, filed on Jul. 1, 1997.

(51) Int. Cl.[7] ................................................. G06F 11/00
(52) U.S. Cl. ...................................................... 714/4; 714/7
(58) Field of Search ........................... 395/182.02, 200.16, 395/727, 828; 714/4, 7, 9

(56) References Cited

U.S. PATENT DOCUMENTS

| 5,526,483 | * | 6/1996 | French et al. | 395/182.02 |
| 5,592,611 | | 1/1997 | Midgely et al. | 714/4 |
| 5,596,723 | * | 1/1997 | Romohr | 395/200.16 |
| 5,633,999 | | 5/1997 | Clowes et al. | 714/6 |
| 5,642,515 | * | 6/1997 | Jones et al. | 395/727 |
| 5,729,689 | * | 3/1988 | Alllard et al. | 709/228 |
| 5,748,980 | * | 5/1998 | Lipe et al. | 395/828 |
| 5,781,716 | | 7/1998 | Hemphill et al. | 714/4 |

OTHER PUBLICATIONS

Internet site: http://samba.anu.edu.au/cifs/docs.what–is–smb.html, pp. 1–8.

Leach et al., Internet–Draft entitled "A Common Internet File System (CIFS/1.0) Protocol,"December 19, 1997, 8 pages.

* cited by examiner

Primary Examiner—Thomas C. Lee
Assistant Examiner—Nguyen Xuan Nguyen
(74) Attorney, Agent, or Firm—Rocco L. Adornato; Mark T. Starr

(57) ABSTRACT

A system and method for providing redundant access to a network-based storage medium. The storage medium is divided into at least two partitions and two computers are configured as network servers, one each of the computers acting as a server for one each of the partitions. Each of the computers is assigned a unique name to identify it to the network. A first one of the computers supports multiple network names. When the other computer fails or goes off-line the first computer is configured to respond to both the first name and the second name, and to act as a network server for both partitions. The network can thus access the partition served by the second computer even though the second computer is off-line. When the second computer returns on-line, the first computer is re-configured to its initial configuration.

12 Claims, 3 Drawing Sheets

INSC BLOCK DIAGRAM

TECHNIQUE TO SUPPORT PSEUDO-NAMES

This is a Provisional U.S. filing Ser. No. 60/051,425 filed circa Jul. 1, 1997 under same title and claims priority therefrom.

This relates to server protocol and more particularly to methods for supporting multiple node-names therein.

More particularly it involves multiple name support on a single (Microsoft NT) server for SMB protocol over TCP/IP.

Problem: when a node (e.g. node A) in a certain computer network "fails", it becomes unable to respond to commands. I conceived that it would be advantageous for a "neighbor" node (e.g. node B) to be able to respond to such node A commands on behalf of node A—as well as responding (e.g. to commands) for itself. A salient feature hereof is to facilitate such, preferably "tricking" the Microsoft NETBIOS software (which normally accepts just one name as an input e.g. to node A) to also respond to another name (e.g. that for node B—both names being given by node B when node A "fails").

Thus, an object hereof is to address the problem, in a multi-computer array (network) where one computer (e.g. server) becomes inoperative and cannot respond to commands, etc.—especially where this array uses an operating system that depends on a certain NAME for each computer to properly function.

Our solution, in part, is to provide some (or all) computers in this array with the ability to take over (at least some of) the functions of the failed computer—and particularly that such a "take-over computer" be able to support more than one name (e.g. its own name plus that of the failed computer).

Further, an object hereof is to provide a multi-computer array in which at least some of the computers can assume at least some functions for other computers if these others "fail", and particularly where, in a Name-dependent operating system, such "take-over computers" can support more than one name, including their own name and that of a failed computer. This is particularly useful where NETBIOS and SMB Services are assumed in a Windows NT operating system.

Another problem in a multi-node array is where certain nodes (e.g. all nodes) are provided with "resources" (e.g. software and tables) that allows them to store information, etc., and where such a node "fails" it cannot communicate with, or respond to, other nodes, etc. Our solution here is similar to the above-noted feature, and involves providing nodes with "resources" such as software and tables data etc. that allow each node to execute commands to, and otherwise act for, a "failed" node.

Thus, it is an object hereof to address (at least some of) problems noted herein and to provide (at least some of the advantageous features noted.

BRIEF DESCRIPTION OF THE DRAWINGS

These and other features and advantages of the present invention will be appreciated by workers as they become better understood by reference to the following detailed description of the present preferred embodiments; these should be considered in conjunction with the accompanying drawings, wherein.

The invention will be better appreciated by workers upon consideration of the following detailed description of preferred embodiments.

DESCRIPTION OF PREFERRED EMBODIMENTS

General Description, Background

The means discussed herein will generally be understood as selected, formulated, and operating as presently known in the art, except where otherwise specified. And, except as otherwise specified, all materials, methods, and devices and apparatus herein will be understood as implemented by known expedients according to present good practice.

Figure 1:
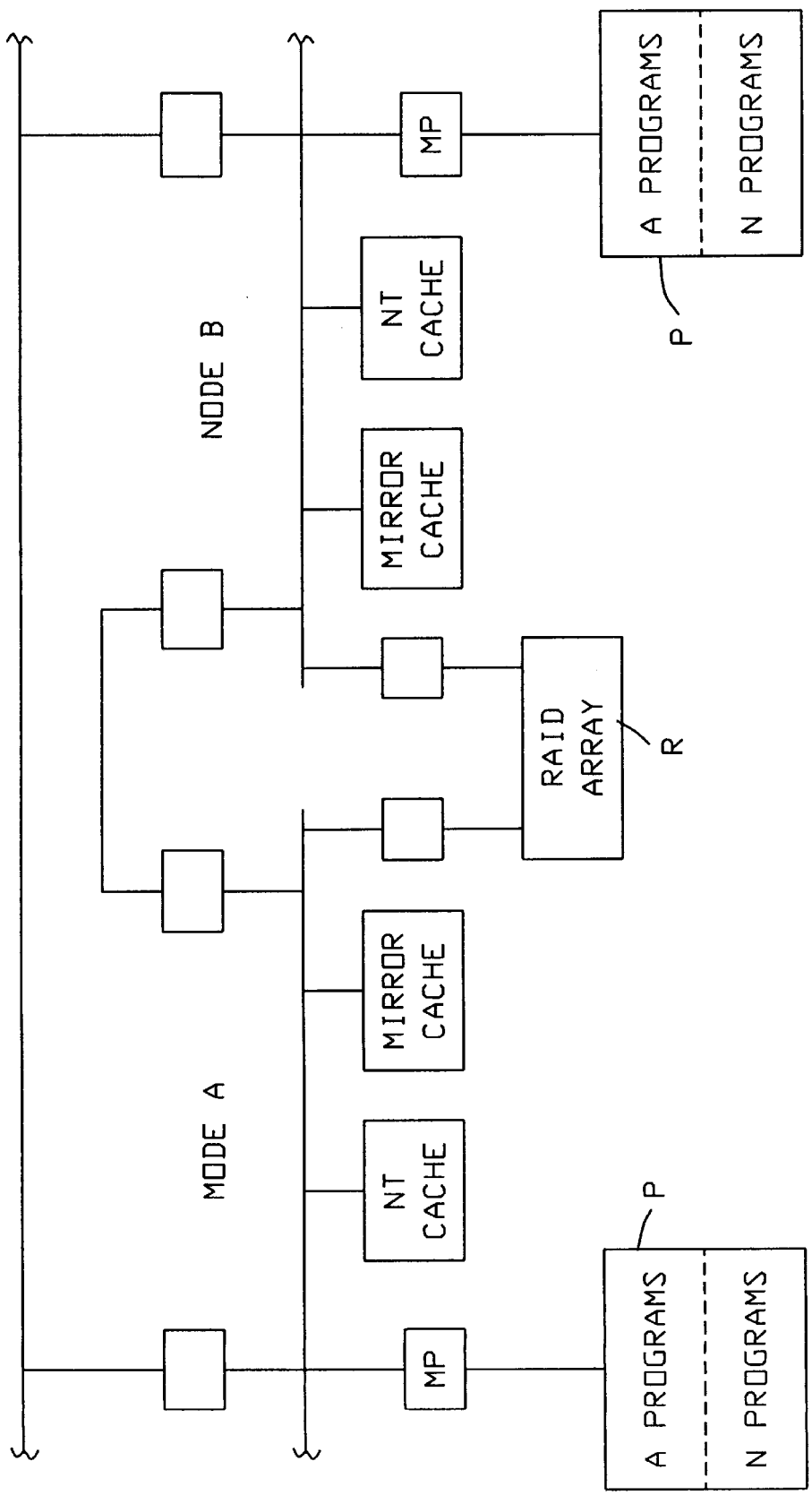
FIG. 1 in very schematic, greatly simplified, of part of a multi-node, multi-computer array(network) apt for using the invention.

FIG. 1 shows a schematic, simplified block diagram of part of a communications network, including a pair of adjacent nodes (node A, node B). Here, we assume Microsoft NT operating, with each node functioning as an NT Server—e.g. via SMB, or "Server Message Block" server protocol over TCP/IP, or "Transmission Control/Internet-Protocol"—this preferably residing over a related network driver.

And assume, for this, a suitable NETBIOS (basic I/O system for NET), e.g. as protocol to communicate over the Network.

Nodes A,B are similar, each including a microprocessor stage MP, software P (e.g. "standard" programs A,B,C, etc. plus replacement programs N, etc.) plus cache storage (e.g. NT cache, mirror cache) and both share access to mass storage such as RAID array R.

Figure 2:
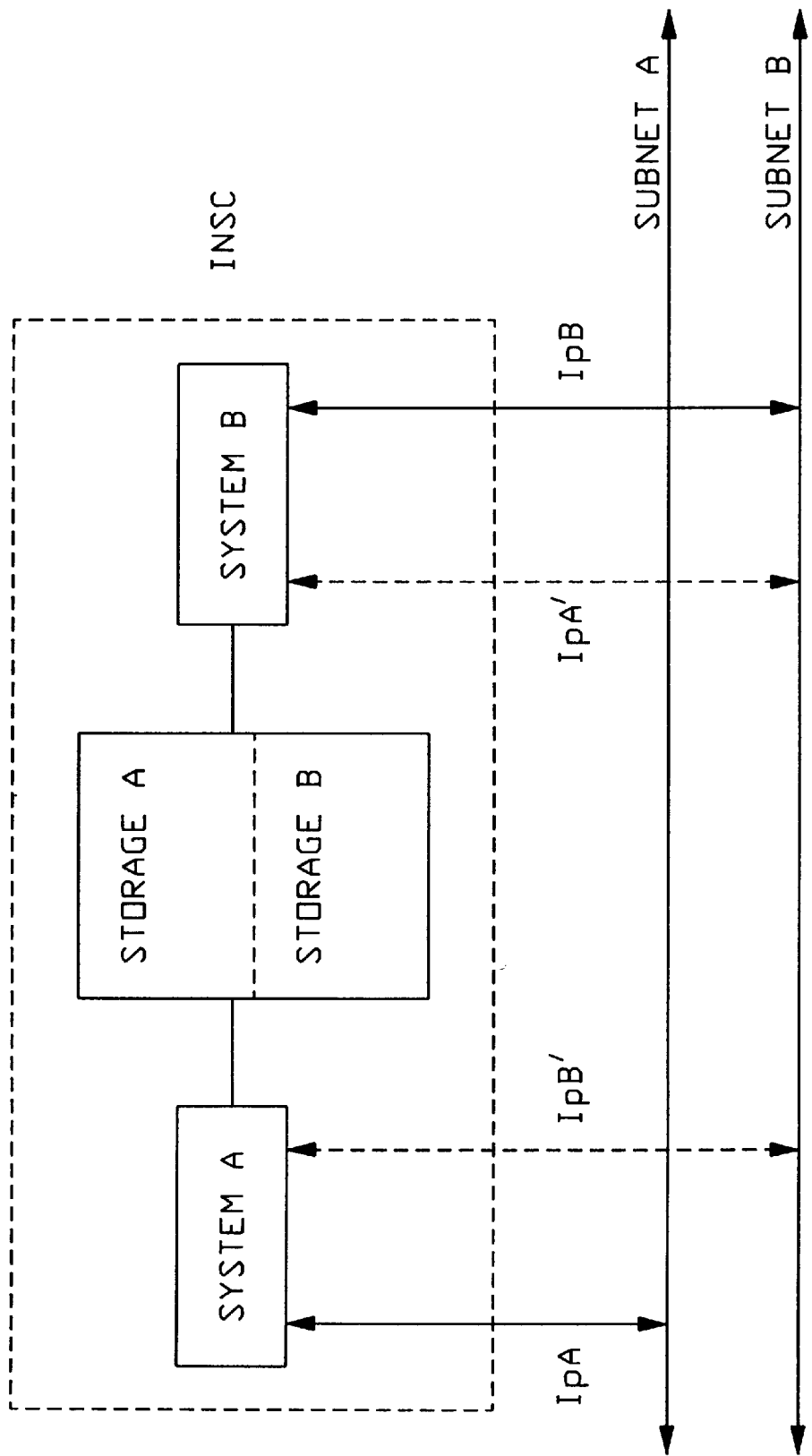
FIG. 2 is like FIG. 1, depicting a variation thereof.

FIG. 2: INSC Block Diagram;

FIG. 2 is a block diagram showing a preferred use embodiment for a related INSC ("Intelligent Network Storage Controller") array, showing system A and system B, assumed running the Windows NT operating system. Here, a System A and a like System B (like nodes A, B above) in the INSC configuration are coupled to access storage units A, B and to communicate (e.g. via bus subnet A, bus subnet B) with other resources (e.g. other parts of a network).

Intelligent Network Storage Controller (INSC) will be understood as a highly available Network Attached Storage whose design will be understood to support two Computers running Microsoft Windows NT operating system. When one of the computer goes down for some reason, the other computer will take over all the functions of the failed computer. The NETBIOS and SMB services of the Microsoft Windows NT Operating system depend on the "name" of the computer to function. So, to provide this functionality, it is required that the computer that "takes over" should support more than one name. This calls for supporting multiple names in a single computer, as a feature hereof.

To support Multiple names in Windows NT Operating system environment, and provide the SMB file services, the following functionalities are required:

A. Register the Computer name using the NETBIOS Protocol specified in the RFC 1001, and RFC 1002, and respond to name queries from the other computers in the network;

B. The SMB server should be listening for the network requests on that computer name. Requirement A is effected using a driver module that registers the second name with the appropriate NETBIOS Transport. To satisy requirement #B.

As per the Internet draft document CIFS 1.0, the SMB Server on Windows NT listens on:

1. The Computer names.
2. A special name "*SMBSERVER"

The solution here is to use the special name "*SMBSERVER" for the additional names. With this solution it is possible to support any number of names.

When both the Systems (FIG. 2) are Up and Running:

Active IP addresses are IpA, IpB

"Storage A" is accessed only by System A, and "Storage B" accessed only by System B.

Clients could connect to both computers system A, and system B.

Thus, if system A should fail for some reason, the following occurs:

1. System B will Activate IpA'—(Active Ip Addresses are IpA', IpB);.
2. System B will take over the Storage A
3. System B will take over the name of System A.

Thus, after a brief pause the clients will see the System A, as if it is were "alive".

Later, when system A comes back alive:

4. System B will deactivate IpA'. (Active Ip Addresses are IpA, IpB);
5. System B will release Storage A.
6. and System B will also release the name of system A.

After a brief pause clients of System A (physically connected to System B) will reconnect to system A.

Workers will understand that to perform this function #6, the system B must support multiple names.

Preferably, the indicated INSC supports multiple names using two Windows NT Kernel mode drivers; i.e. using a "Name Responder Driver" (NRD); plus a "Name Proxy Driver" (NPD).

Figure 3:
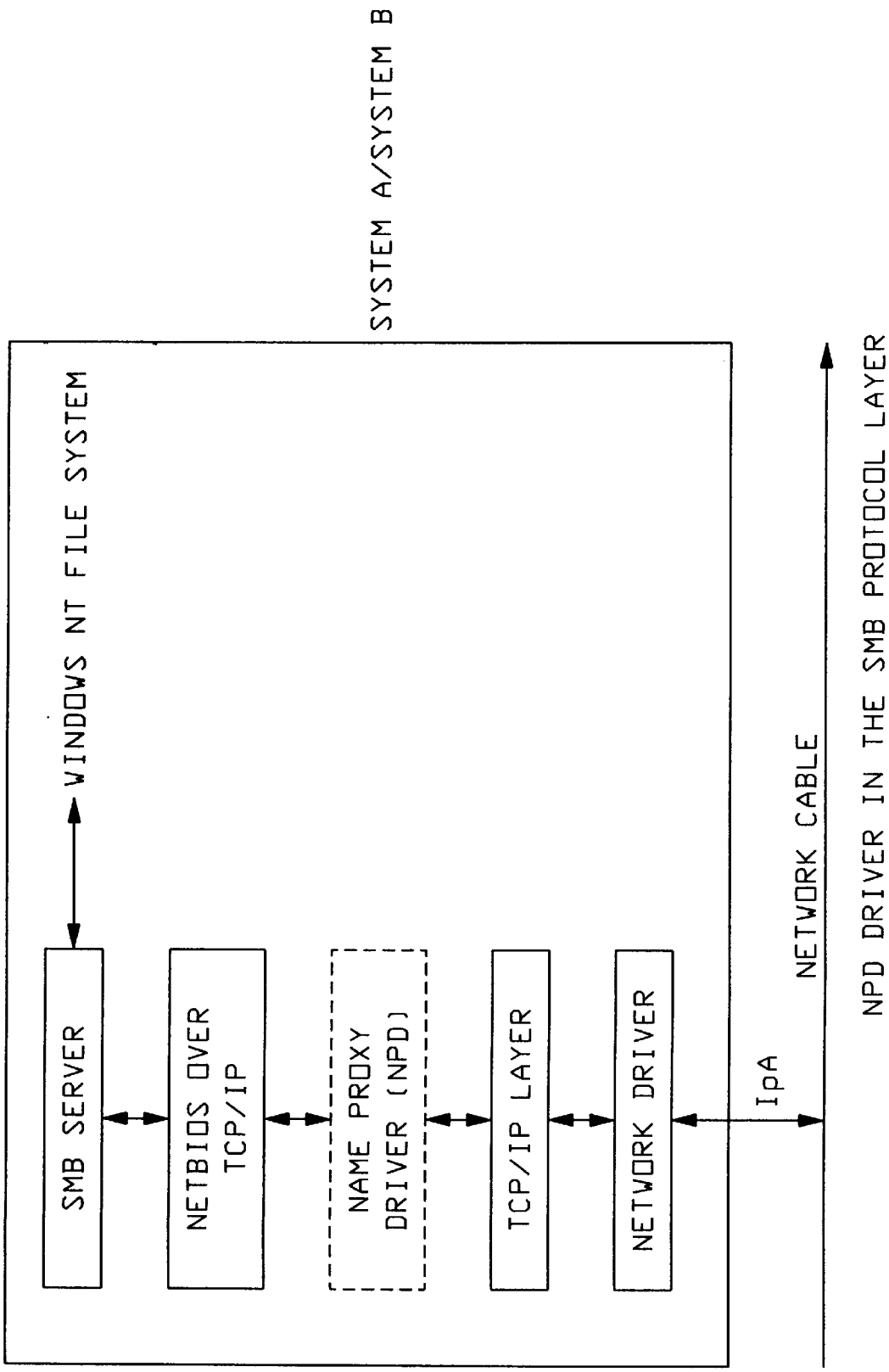
FIG. 3 is a simplified block diagram of a variation of such an array as coupled to use our invention.

FIG. 3 is a block diagram of a related array comprising an SMB Server unit SV, a NETBIOS over TCP/IP stage NB, a Name Proxy Driver, NPD, a TCP/IP layer T and a Network Drive ND, all coupled, in order, between a Windows NT File system and Network cable. FIG. 3 shows where the NPD driver preferably fits into the SMB protocol layer of System A and system B.

Server SV will be understood as apt for file-sharing data (e.g. disk storage for clients). The Network cable can be coupled for accessing other systems (clients), and other nodes in a common network (e.g. like that of FIG. 1).

A salient feature is Name Proxy Driver NPD. Assume here (FIG. 3) that SMB Server SV works over the NETBIOS, over TCP/IP. Also included is a Name Respond Driver stage NRD which, according to another novel feature, acts to attach or detach a name to a particular NETBIOS Transport (e.g. sending message packets according to NETBIOS protocol, as with WINS, where node A, with an IP address and name communicates with node B, having different IP address and name).

As workers will appreciate, so attaching a name (by NRD) causes the system to execute NETBIOS; e.g. preferably as follows:

1—Name registration with WINS name server;
2—Respond for "Name-Query" broadcasts; and
3—Send out name-refresh messages.

This, according to the invention, causes the NETBIOS module to think that a now-attached name is its own (i.e. as well as its own regular name—preferably this module has software for this—e.g. loaded into memory and here "ON" and running—of Windows Internet naming protocol SMB Server SV, on Windows NT, will be understood to work over NETBIOS, over TCP/IP. Thus, it will be understood that the Name Respond Driver, NRD, can attach/detach a name to a node), SMB Server MP (or any NETBIOS application) should be listening, on that name, to provide successfull connections to the clients.

FIG. 2 also indicates how the SMB "protocol stack" looks when it includes a Name Proxy Driver NPD according to a feature hereof. It will be seen that the NPD layers itself between the TCP/IP layer and the "NETBIOS over TCP/IP". Here, NPD makes use of the fact that SMB Server SV uses a special name "*SMBSERVER" to accommodate connections from clients that are not aware of the prevailing NETBIOS names (e.g. such as UNIX clients).

Thus, I characterize this feature as "multiple NETBIOS-Name Support on a single Microsoft NT Server for SMB Protocol over TCP/IP" (the latter preferably being rendered over a suitable network driver. Ref: Internet standard: RFC 1001, 1002; Internet draft: common Internet "Filesystem" protocol (CIFS/1.0).

Workers will understand that this feature allows a computer running Microsoft Windows NT operating system to act as a proxy in providing file sharing capabilities (using SMB Protocol) for one or more other computers. This capability is a very useful feature in Windows NT clusters environment.

Flow of Network packets thru the NPD Driver (FIG. 3) works as follows:

A—Sending side
(a) SMB server sends the Network packets to the NETBIOS over TCP/IP (FIG. 3);
(b) NETBIOS over TCP/IP sends the packets to the NPD Driver;
(c) NPD Driver just passes the packets down the TCP/IP Layer;

TCP/IP Layer sends the packet to the Network Driver that initiates the transmission of the packet.

B—Receiving side:
(aa) Network Packets received by the Network Driver are passed to the TCP/IP Layer;
(bb) TCP/IP looks at the packet, and sends all the NETBIOS packets to NPD driver;
(cc) NPD Driver looks at the packet to see if it is a session request packet
(cc-1) If it is a NETBIOS session request packet, the NPD Driver replaces the called name to "*SMBSERVER" and send the packet to the SMB Server.
(cc-2) All other packets are forwarded to the SMB Server.
(dd) SMB server decodes the request and issues the appropriate calls to the flesystem (such as open, read, write close . . . etc.).

Of course, many modifications to the preferred embodiments described previously are possible without departing from the spirit of the present invention e.g. as here claimed. For example, there are other different ways to provide the needed support in the present invention, and it is not limited to the particular types of support specified. As a further example, the "Pseudo-name" support for failed nodes can be other than as described in its referred embodiment. Additionally, some features of the present invention can be used to advantage without the corresponding use of other features.

What is claimed is:

1. In a high-availability multi-computer network, running in an "Intelligent Network Storage Controller" (INSC) configuration supporting a first computer and at least a second computer operating with NETBIOS and SMB services of The Microsoft Windows NT operating system so that either computer depends upon its own unique "Name" to function, a method of compensating for a loss of functionality experienced by either computer by equipping both computers to also support the Name of the other and to automatically called-upon to provide functionality for the other when such becomes impaired, including providing SMB file services therefor; and further comprising an SMB protocol stack resident on both the first computer and the second computer, and wherein the SMB protocol stack comprises a name proxy drive NPD which layers itself between a TCP/IP layer and a "NETBIOS over TCP/IP", and wherein NPD makes use of the fact that the SMB services uses a special name "*SMBSERVER" to accommodate connections from clients that are unaware of a prevailing NETBIOS name associated with one of the first and the second computers.

2. The invention of claim 1, wherein each computer registers the computer NAME of the other using NETBIOS protocol; and enabling SMB Server to "listen" for regrets under that computer name.

3. The invention of claim 2, wherein the driver module of each computer registers its own name and that of the other computer with appropriate NETBIOS transport means.

4. The invention of claim 3, wherein the SMB server listens for each computer name and also for a "special name" SN. Which is used as a proxy for other names, thus allowing any number N of computers into the network, with special name SN supporting any number of additional names.

5. The invention of claim 4, wherein said INSC supports multiple computer names by using a pair of NT Kernel mode driver—stages namely: a "Name Responder Driver" (NRD) and a "Name Proxy Driver" (NPD).

6. The invention of claim 4, where SMB Server SV works over the NETBIOS over TCP/IP, where Name Respond Driver stage NRD is adapted to attach, or detach a name to a particular NETBIOS transport means.

7. The invention of claim 6, where the system is made to send message packets according to NETBIOS protocol.

8. The invention of claim 7, wherein, under WINS, computer A with IP address IP-A and name N-A communicates with computer B having different IP address IP-B and different name N-B.

9. The invention of claim 8, wherein attaching a name by driver stage NRD causes the system to execute NETBIOS.

10. The invention of claim 9, wherein the array comprises an SMB Server, a NETBIOS over a TCP/IP stage, a Name Proxy Driver NPD, a TCP/IP layer and a Network Driver stage, all coupled in order, between a Windows NT file system and a Network cable, with driver NPD fitted into the protocol layer of computer A and computer B.

11. The invention of claim 8, wherein the array comprises an SMB Server, a NETBIOS over a TCP/IP stage, a Name Proxy Driver NPD, a TCP/IP layer and a Network Driver stage, all coupled in order, between a Windows NT file system and a Network cable, with driver NPD fitted into the protocol layer of computer A and computer B; wherein attaching a name by driver stage NRD causes the system to execute NETBIOS.

12. The invention of claim 11, where Names are registered with WINS server;

Name-Query broadcasts are responded-to, and

Name-refresh messages are sent out.

* * * * *